United States Patent

Nakamura

[11] Patent Number: 5,285,861
[45] Date of Patent: Feb. 15, 1994

[54] STEERING DEVICE OF CRAWLER TYPE VEHICLE

[75] Inventor: Mitsuaki Nakamura, Ishikawa, Japan

[73] Assignee: Kabushiki Kaisha Komatsu Seisakusho, Tokyo, Japan

[21] Appl. No.: 936,565

[22] Filed: Aug. 27, 1992

[51] Int. Cl.$^5$ .............................................. B62D 11/10
[52] U.S. Cl. ..................................... 180/6.44; 180/6.7; 180/333; 74/471 XY
[58] Field of Search ...................... 180/6.44, 6.66, 6.7, 180/6.2, 6.48, 333; 74/471 XY

[56] References Cited

U.S. PATENT DOCUMENTS

| | | | |
|---|---|---|---|
| 3,717,212 | 2/1973 | Potter | 180/6.44 |
| 4,076,090 | 2/1978 | Krusche et al. | 74/471 XY |
| 4,174,762 | 11/1979 | Hopkins et al. | 180/6.44 |
| 4,541,497 | 9/1985 | Riediger et al. | 180/6.48 |
| 4,700,794 | 10/1987 | Bernhagen et al. | 180/6.44 |
| 4,736,646 | 4/1988 | Shimoie et al. | 74/471 XY |
| 5,184,646 | 2/1993 | Hori et al. | 74/471 XY |

FOREIGN PATENT DOCUMENTS 59-501501 8/1984 Japan .
WO84/01134 3/1984 PCT Int'l Appl. .

Primary Examiner—David M. Mitchell
Assistant Examiner—Kevin Hurley
Attorney, Agent, or Firm—Richards, Medlock & Andrews

[57] ABSTRACT

When a lever (48) is rocked either rightwardly or leftwardly while the lever (48) is rocked forwardly and the vehicle is moving forwardly, the vehicle is steered in the direction in which lever (48) is rocked. When the lever (48) is rocked either rightwardly or leftwardly while the lever (48) is rocked backwardly and the vehicle is moving backwardly, the vehicle is steered in the direction in which lever (48) is rocked. For the above operation, a valve body (44) comprising a pilot valve (420) and a change valve (421) is coupled to the lever (48). The lever (48) is rocked rightwardly or leftwardly, and pressure oil supplied through the pilot valve (420) actuates a rotary direction changing valve (25). When the lever (48) is rocked backwardly, the change valve (421) switches the direction in which the pressure oil is supplied through the pilot valve (420) to the reverse direction.

20 Claims, 5 Drawing Sheets

5,285,861

STEERING DEVICE OF CRAWLER TYPE VEHICLE

TECHNICAL FIELD

The present invention relates to a steering device in which a single steering lever controls rightward/leftward and forward/backward steering of a crawler type vehicle so that the possibility of misoperation is reduced.

BACKGROUND ART

A crawler type Vehicle is disclosed in Japanese Published Unexamined Patent Application No. 59-501501. This vehicle is equipped with a planetary steering differential device and uses a single steering lever device to control rightward/leftward and forward/backward steering of the vehicle.

The known single steering lever device comprises a grip and an upright pivotal movement supporting portion. The grip is grasped by the operator's palm and tilted upwardly, and has a device for transmitting torsional rotary motion. The upright pivotal movement supporting portion has a device for transmitting pivotal movement, which supports the grip so that it can rock on a fixed upright axis within a lateral plane. The former torsional rotary motion transmitting device is coupled through a mechanical link to a forward/backward change valve of a speed change gear so that the crawler type vehicle is driven forwardly or backwardly or is in neutral. The latter pivotal movement transmitting device is coupled through the mechanical link to a change valve. The change valve changes the direction in which a steering hydraulic motor rotates. The steering hydraulic motor inputs rotary power of differential steering to the planetary steering differential device. The crawler type vehicle can be driven straight or pivoted rightwardly/leftwardly.

Steering the vehicle using the former device is easy since the desired movement of the vehicle is obtained by rotating the operator's wrist in the direction in which the vehicle is to move, that is, when the grip is moved forwardly while the grip is being rotated, the vehicle moves forwardly, whereas when the grip is moved backwardly while the grip is being rotated, the vehicle moves backwardly. However, pivoting the vehicle using the latter device has a disadvantage.

That is, even when the grip is rocked backwardly and then is rocked rightwardly or leftwardly for pivoting the vehicle, the rocking direction does not agree with the pivoting direction. The problem of the conventional art is that the vehicle does not pivot in the direction in which the lever is rocked.

SUMMARY OF THE INVENTION

The present invention provides means in which, when a single lever is operated in the same direction as the direction in which the vehicle moves, the vehicle moves as the operator desires. There is provided a steering device of a crawler type vehicle, capable of selecting either power for forward movement or power for backward movement, in which power is inputted by a direction selector from a primary power inputting unit to a planetary steering differential device which drives righthand and lefthand crawlers, the vehicle being pivotally steered either rightwardly or leftwardly by a secondary power inputting unit coupled to a pivotal steering operation device, characterized in that a lever member linked to a hydraulic pilot change valve is coupled through linking means to the direction selector, the valve body switching a rotary direction changing valve which changes a direction in which the pivotal steering operation device is rotated, whereby the selecting either power for forward movement or power for backward movement by the direction selector is interlocked with the switching of the rotary direction changing valve.

The lever member linked to the hydraulic pilot change valve is coupled through the linking means to the direction selector. The valve body switches a rotary direction changing valve which changes the direction in which the pivotal steering operation device is rotated, whereby the selecting either power for forward movement or power for backward movement by the direction selector is interlocked with the switching of the rotary direction changing valve. It is therefore possible to operate the single lever in the same direction as the direction in which the vehicle moves, and to move the vehicle as the operator desires.

BEST MODE OF CARRYING OUT THE INVENTION

Figure 1:
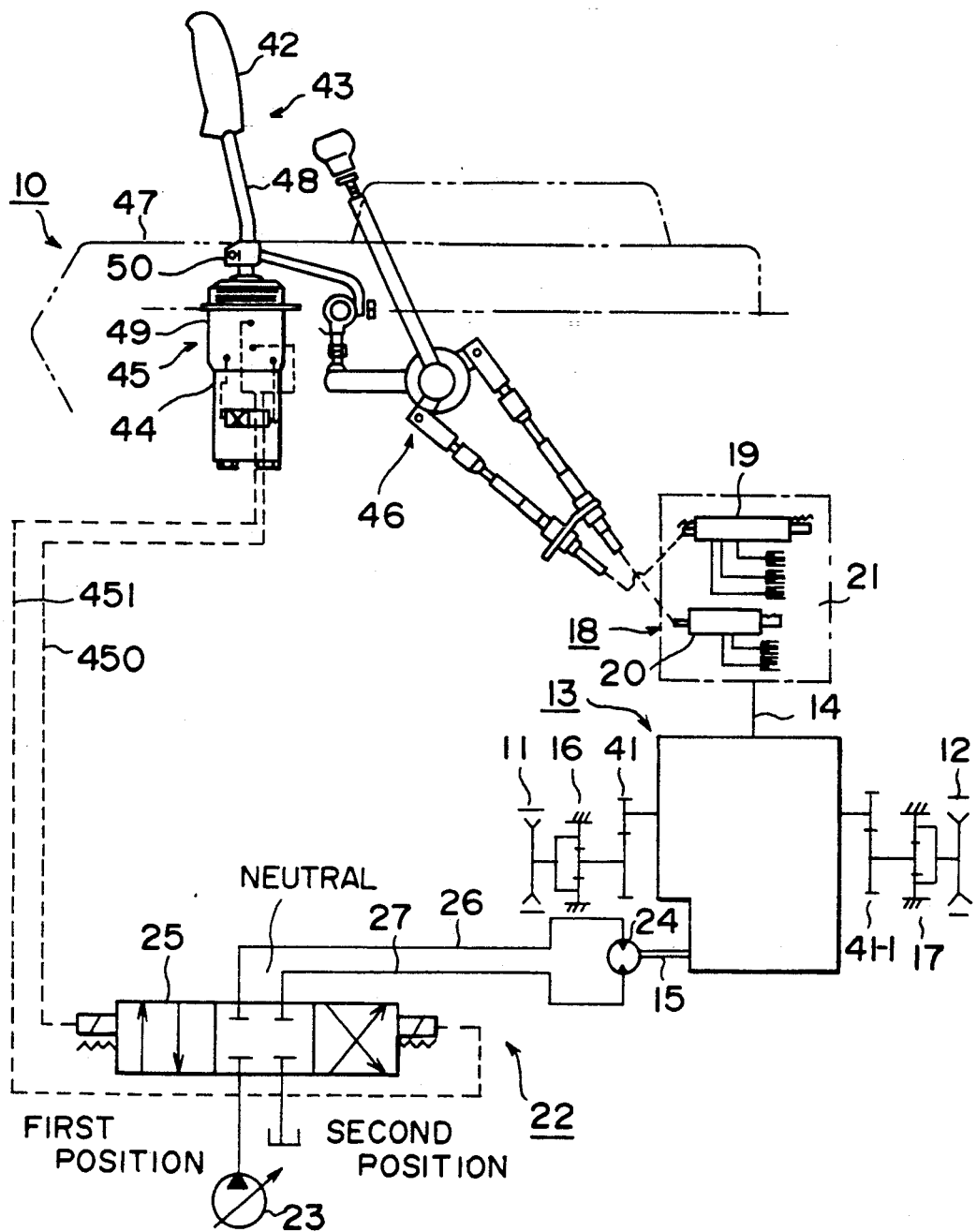
FIG. 1 is a view showing a steering device in accordance with an embodiment of the present invention.

An embodiment of the present invention will be described on the basis of the drawings.

A vehicle including a steering device 10 has righthand and lefthand crawlers 11 and 12. The crawlers 11 and 12 are driven by a planetary steering differential device 13, which is usually of a known type and supplies forward/backward speed change power and pivotal steering power to righthand and lefthand final driving devices 16 and 17. The forward/backward speed change power is transmitted from a primary power inputting unit 14, whereas the pivotal steering power is transmitted from a secondary power inputting unit 15. The primary power inputting unit 14 is coupled to a planetary change gear 18. The change gear 18 usually has a known structure which includes a speed change control device 21 composed of a speed change selector spool 19 for selecting a plurality of speeds and a direction selector 20 for selecting the direction in which the vehicle moves forwardly or backwardly. The planetary change gear 18 inputs driving power to the primary power inputting unit 14, the driving power indicating the direction in which the vehicle moves and the speed at which it moves.

The secondary power inputting unit 15 is coupled to a pivotal steering operation device 22. The pivotal steering operation device 22 comprises a variable displacement steering pump 23, a fixed displacement steering motor 24, and a rotary direction changing valve 25 for switching the steering motor 24 to a right or left rotary direction from a neutral rotary direction. The variable displacement steering pump 23 is driven by an unillustrated engine. A pressure fluid is introduced to the fixed displacement steering motor 24 through either of a pair of hydraulic piping 26 and 27. Thus, the motor 24 is rotated at a selected speed and direction, and the pivotal steering power is inputted to the secondary power inputting unit 15.

Figure 2:
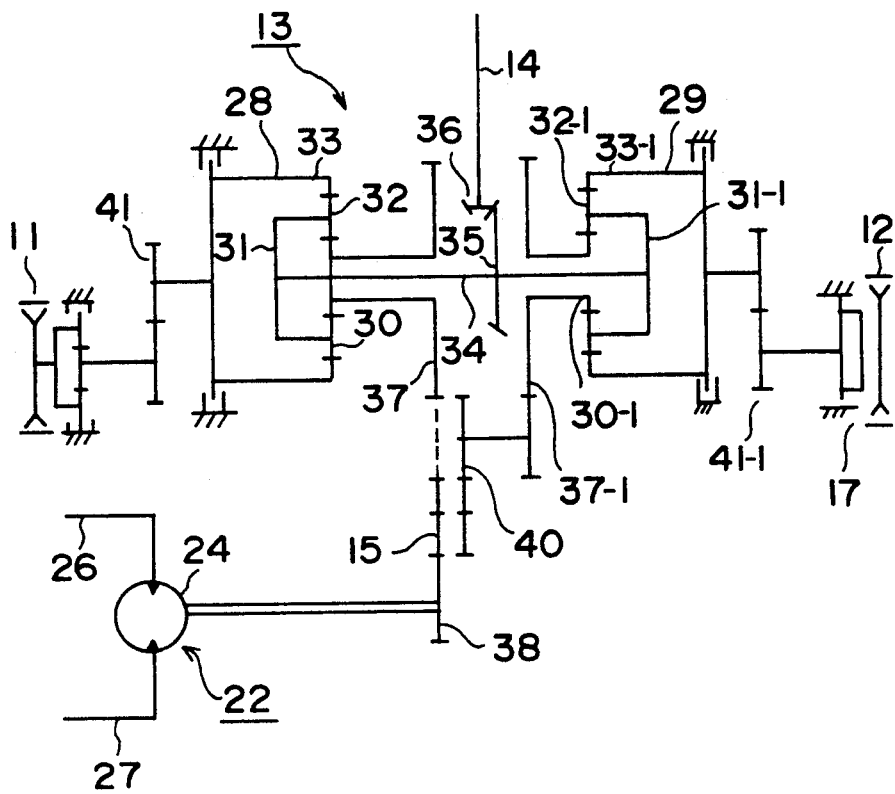
FIG. 2 is a detailed view of a planetary steering differential device 13 of FIG. 1.

Referring now to FIG. 2, the known planetary steering differential device 13 includes a pair of righthand and lefthand differential planetary gear devices 28 and 29. The pair of differential planetary gear devices 28 and 29 are composed of sun gears 30 and 30-1, planetary carriers 31 and 31-1, planetary gears 32 and 32-1, and annular gears 33 and 33-1. The righthand and lefthand planetary carriers 31 and 31-1 are integrally coupled to a horizontal shaft 34. The planetary gear devices are coupled to the primary power inputting unit 14 through a pair of bevel gears 35 and 36 so as to input forward-/backward movement and speed change power. Gears 37 and 37-1 for inputting the pivotal steering power are engaged with and coupled to the righthand and lefthand sun gears 30 and 30-1. The secondary power inputting unit 15 is driven by the motor 24 through a gear 38. One gear 37 for inputting the pivotal steering power is directly driven by the secondary power inputting unit 15, whereas the other gear 37-1 for inputting pivotal steering power is driven through an intermediate gear 40. Pivotal steering power for different rotary directions is inputted to the righthand and lefthand gears 37 and 37-1 for inputting pivotal steering power.

Referring again to FIG. 1, the steering mechanism 10 comprises a steering direction selecting link device 46, and a pivotal steering selector 45 which includes a valve body 44, and a forwardly tilting lever member 43 having a grip 42. The forwardly tilting lever member 43 is a single steering lever 48 positioned diagonally forward of a lefthand arm rest 47 of a driver's seat. The lever 48 is fastened by a screw to a cross joint 50 provided in the housing 49 of the valve body 44.

Figure 3:
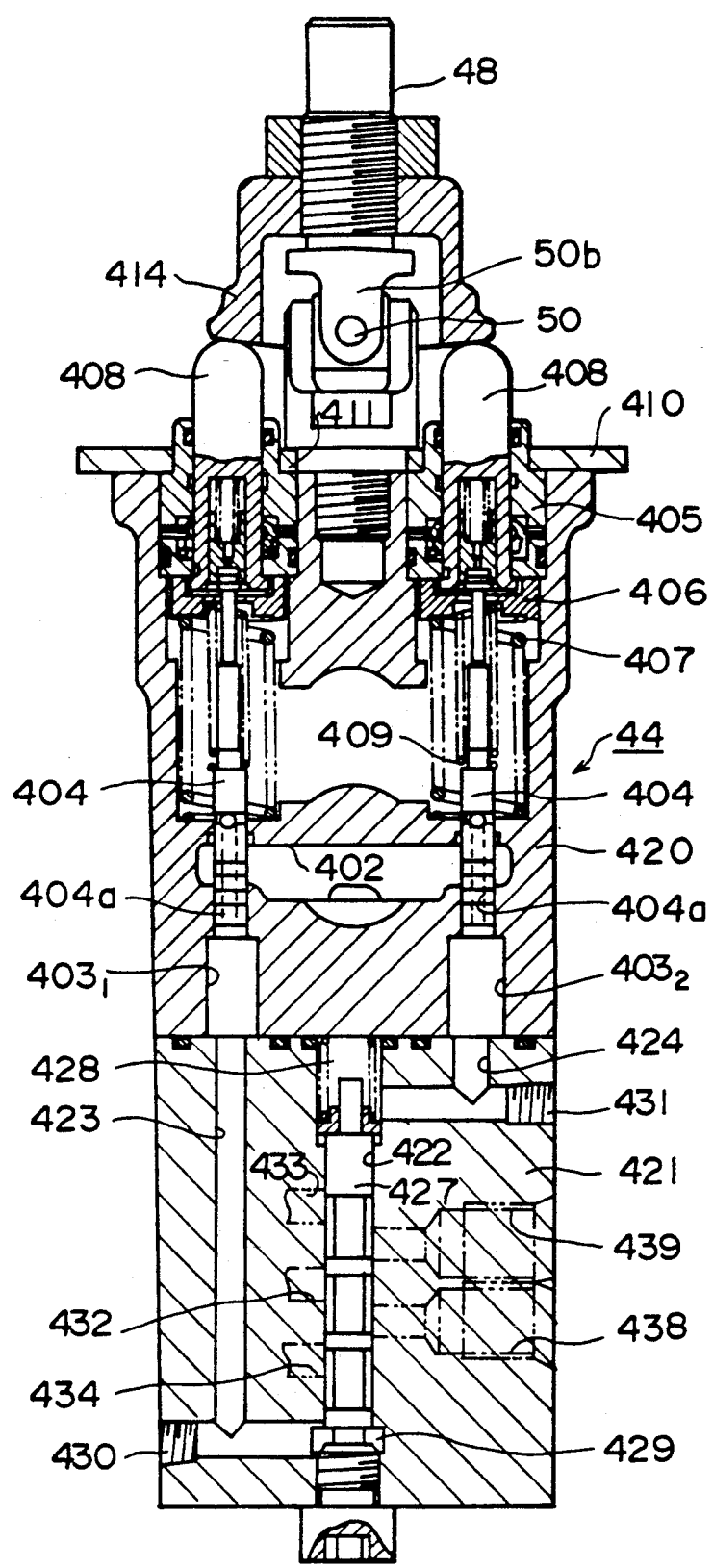
FIG. 3 is a detailed view showing a section of a valve body 44 of FIG. 1.
Figure 4:
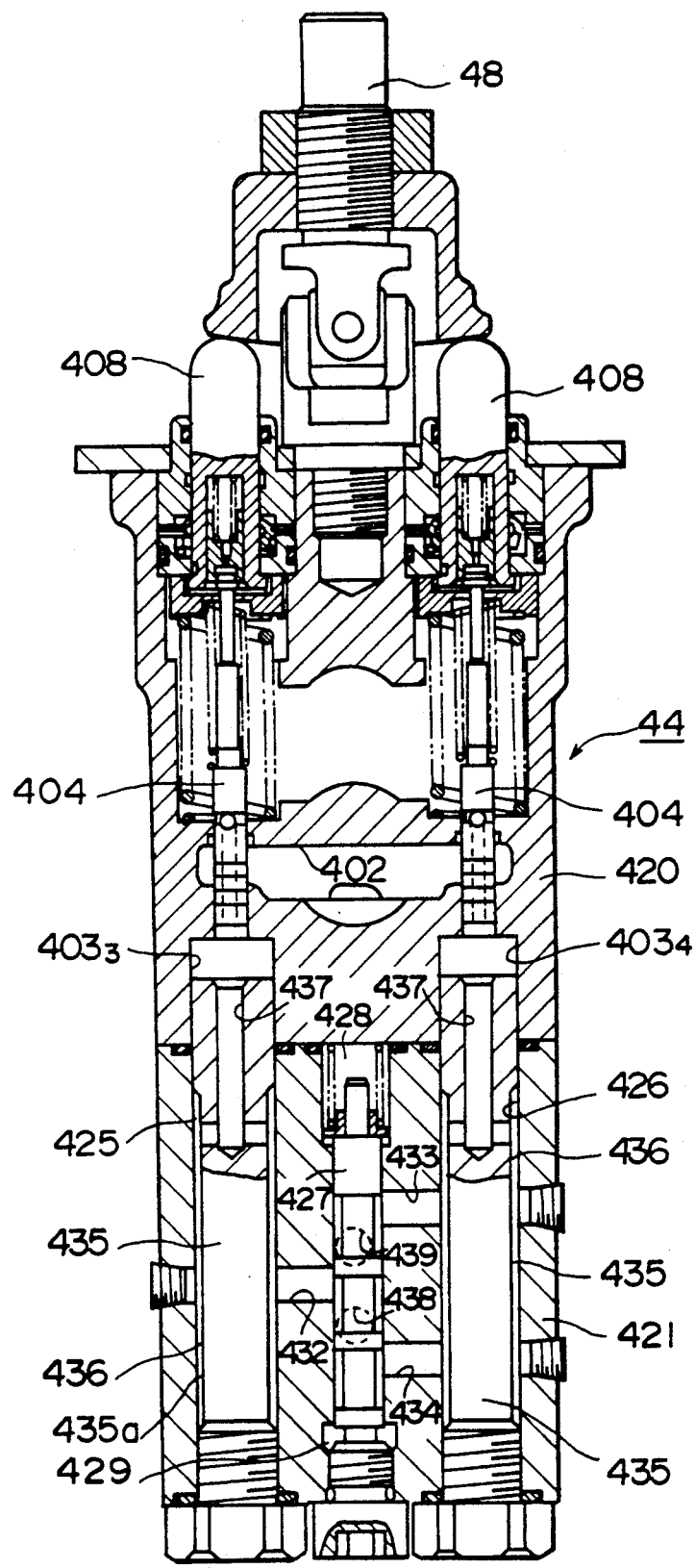
FIG. 4 is a detailed sectional view in which the phase of the valve body of FIG. 3 is rotated 180°.

The valve body 44 will be described in detail with reference to FIGS. 3 and 4 showing a section of the valve body 44. For the sake of explanation, FIG. 3 is a forward/backward longitudinal sectional view, and FIG. 4 is a right/left longitudinal sectional view. The valve body 44 is formed of a pilot valve 420 and a change valve 421. Four spools 404 for communicating with or blocking outlet ports 403 are slidably provided in the pilot valve 420. Guide cylinders 405 are provided so as to be coaxial with the spools 404, and retainers 406 are disposed below the guide cylinders 405. Main springs 407 press the retainers 406 against the guide cylinders 405 so as to upwardly press and retain pistons 408 which slide in the guide cylinders 405. Springs 409 retain the spools 404 so that the spools come to positions where they block the outlet ports. The base 50b of the cross joint 50 is screwed in and attached to the upper portion of the pilot valve 420 through a hole 411 in a plate 410 on the upper portion of the valve body 44. The lever 48 is attached to the base 50b, and a disk 414 is attached. When the lever 48 is rocked forwardly/backwardly or right/left, the disk 414 depresses any one of the pistons 408 so that the corresponding spool 404 comes to a position where it communicates with the outlet port. Pressure oil in a hydraulic port 402 is supplied to the outlet port 403 through an oil hole 404a in the spool 404.

A pair of forward and backward outlet ports are referred to as first and second outlet ports $403_1$ and $403_2$, whereas a pair of righthand and lefthand outlet ports are referred to as third and fourth outlet ports $403_3$ and $403_4$. A spool hole 422, and first, second, third and fourth holes 423, 424, 425 and 426 are formed in the change valve 421. A change spool 427 is inserted into the spool hole 422, thus forming a first pressure receiving chamber 428 and a second pressure receiving chamber 429. The first hole 423 is open to the first outlet port $403_1$ and communicates with the second pressure receiving chamber 429 and a first main outlet port 430. The second hole 424 communicates with the first pressure receiving chamber 428 and a second main outlet port 431; the third hole 425 communicates with the third outlet port $403_3$ and a first inlet port 432; and the fourth hole 426 communicates with the fourth outlet port $403_4$ and second and third inlet ports 433 and 434.

As shown in FIG. 4, bars 435 are inserted into the third and fourth holes 425 and 426 so as to form passageways 436 between the third and fourth holes 425 and 426 and the portions of the bars which have small diameters. The passageways 436 are in communication with oil paths 437 formed in the bars 435 and open not only to the third and fourth outlet ports $403_3$ and $403_4$, but also to the first, second and third inlet ports 432, 433 and 434.

Figure 5:
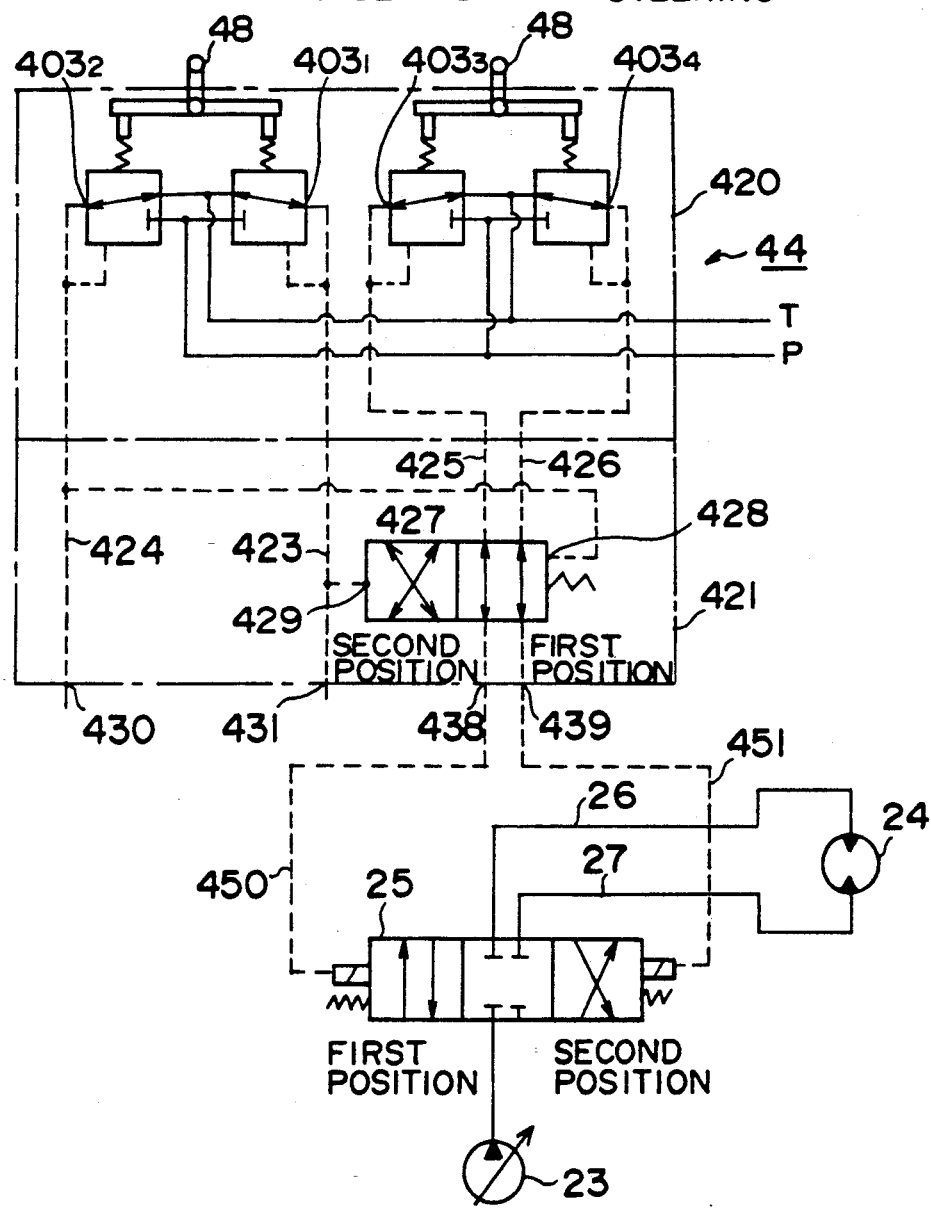
FIG. 5 is a view schematically showing the valve body 44.

The above described change spool 427 moves to a first position communicating with the first, second and third inlet ports 432, 433 and 434 and to a second position communicating with third and fourth main outlet ports 438 and 439, thus forming part of the change valve 421. FIG. 5 schematically shows the above structure.

The operation will now be described.

When it is desired to drive the vehicle straight ahead, the fixed displacement steering motor 24 is positioned in a rotary neutral, thus maintaining the righthand and lefthand gears 37 and 37-1 for inputting the pivotal steering power in a stationary state. Thereby the motor outputs power of the same torque, rotary speed and rotary direction to righthand and lefthand final driving devices 41 and 41-1 through the horizontal shaft 34, the planetary carriers 31 and 31-1, the planetary gears 32 and 32-1, and the annular gears 33 and 33-1 so that the vehicle is driven straight.

When it is desired to pivot the vehicle, the fixed displacement steering motor 24 is rotated, thus rotating the sun gears 32 and 32-1 and the righthand and lefthand gears 41 and 41-1 for inputting the pivotal steering power so that these gears are rotated in different directions. The speed of one of the planetary carriers 31 and 31-1 is reduced, whereas the other is accelerated, thus driving the final driving devices 41 and 41-1 at different speeds so as to pivot the vehicle.

When the lever 48 is in neutral, because of the linking means 46, the direction selector 20 is also in neutral, to which power is not inputted from the primary power inputting unit 14. Pressure oil is not outputted to the respective outlet ports, and the change spool 427 is maintained in the first position shown in FIG. 5. The first inlet port 432 communicates with the third main outlet port 438, whereas the second inlet port 433 communicates with the fourth main outlet port 439. In other words, these ports communicate with each other in a forward direction. Under such conditions, when the lever 48 is rocked rightwardly or leftwardly and pressure oil is outputted to the third outlet port $403_3$ or the fourth outlet port $403_4$, the pressure oil is supplied through the third main outlet port 438 or the fourth main outlet port 439. The direction in which the lever 48 is moved agrees with the direction in which the pressure oil is outputted. In other words, when the lever 48 is rocked to the right, the pressure oil is supplied to pressure oil piping 450, thus causing the rotary direction changing valve 25 to come to a first position. The motor 24 is rotated clockwise, thus pivoting the vehicle rightwardly. When the lever 48 is rocked to the left, the pressure oil is supplied to pressure oil piping 451, thus causing the rotary direction changing valve 25 to come to a second position. The motor 24 is rotated counterclockwise, thus pivoting the vehicle leftwardly.

When the lever 48 is rocked forwardly, the direction selector 20 selects forward movement of the vehicle with the aid of the linking means 46. Power for forward movement is inputted from the primary power inputting unit 14, and the pressure oil is supplied to the pressure receiving chamber 428, thus maintaining the change spool 427 in the first position shown in FIG. 5. The first inlet port 432 communicates with the third main outlet port 438, whereas the second inlet port 433 communicates with the fourth main outlet port 439. In other words, these ports communicate with each other in the forward direction. For this reason, in the same manner as in the neutral position of the lever 48, the direction in which the lever 48 is moved agrees with the direction in which the pressure oil is outputted. In other words, when the lever 48 is rocked rightwardly, the pressure oil is supplied to the pressure oil piping 450, and the rotary direction changing valve 25 comes to the first position, thus rotating the motor 24 clockwise which steers the vehicle rightwardly. When the lever 48 is rocked leftwardly, the pressure oil is supplied to the pressure oil piping 451, and the rotary direction changing valve 25 comes to the second position, thus rotating the motor 24 counterclockwise which steers the vehicle leftwardly.

When the lever 48 is rocked backwardly, the direction selector 20 selects backward movement of the vehicle with the aid of the linking means 46. Power for backward movement is inputted from the primary power inputting unit 14, and the pressure oil is supplied to the pressure receiving chamber 429, thus maintaining the change spool 427 in the second position shown in FIG. 5. The first inlet port 432 communicates with the fourth main outlet port 439, whereas the third inlet port 434 communicates with the first outlet port 438. In other words, these ports communicate with each other in the reverse direction. In this manner, the pressure oil in the third outlet port $403_3$ is supplied to the fourth main outlet port 439, whereas the pressure oil in the fourth outlet port $403_4$ is supplied to the third main outlet port 438. Thus, the direction in which the lever 48 is moved is opposite to the direction in which pressure oil is outputted. In other words, when the lever 48 is rocked rightwardly, the pressure oil is supplied to the pressure oil piping 451, thus causing the rotary direction changing valve 25 to come to the second position, and the motor 24 is rotated counterclockwise. When the lever 48 is rocked leftwardly, the pressure oil is supplied to the pressure oil piping 450, thus causing the rotary direction changing valve 25 to come to the first position, and the motor 24 is rotated clockwise. In such a case; the lever 48 is rocked backwardly, thereby operating the direction selector 20 with the aid of the link mechanism 46 coupled to the lever 48. Since the primary power inputting unit 14 is rotating in a reverse direction, the vehicle is being driven backwardly in the direction in which the lever 48 is rocked.

Figure 6A:
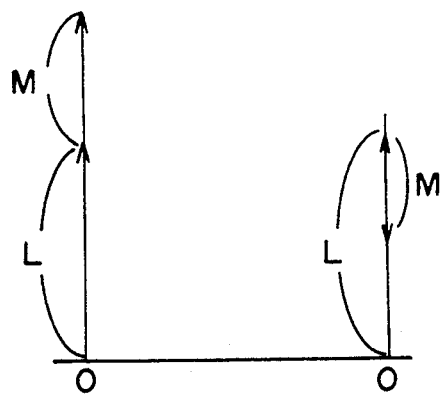
FIGS. 6A and 6B are views illustrating a steering method.
Figure 6B:
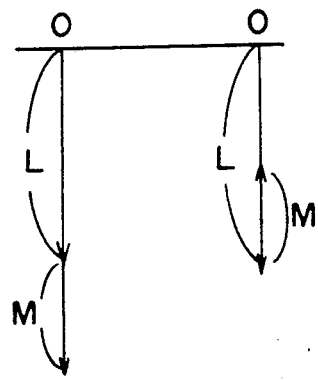

The above relationships are described with reference to FIG. 6 illustrating the steering of the vehicle. FIG. 6A shows forward movement. Arrows on the righthand side indicate the direction in which the righthand crawler 12 moves, whereas arrows on the lefthand side indicate the direction in which the lefthand crawler 11 moves. The length of each arrow indicates travel speed. "L" indicates travel speed on the basis of the primary power inputting unit 14, and "M" indicates travel speed on the basis of the secondary power inputting unit 15. When the lever 48 is rocked rightwardly while it is being moved forwardly, because the motor 24 is rotated clockwise, the speed at which the lefthand crawler moves is expressed by (L+M), whereas the speed at which the righthand crawler moves is expressed by (L−M). The vehicle is thus steered rightwardly. FIG. 6B shows backward movement. Because the motor 24 is rotated counterclockwise when the lever 48 is rocked rightwardly while it is being pivoted backwardly, the speed at which the lefthand crawler moves is expressed by (−L−M) (the lefthand crawler moving backwardly at a speed of (L+M)). The speed at which the righthand crawler moves is expressed by (−L+M) (the righthand crawler moving backwardly at a speed of (L−M). The vehicle is thus steered rightwardly. In other words, during the backward movement of the vehicle, when the lever 48 is rocked rightwardly, the vehicle is steered rightwardly, whereas when it is pivoted leftwardly, the vehicle is steered leftwardly.

What is claimed is:

1. In a steering device of a crawler type vehicle in which one of power for forward movement, power for backward movement, and power capable of selecting a neutral is selectively inputted by a direction selector from a primary power inputting unit to a planetary steering differential device which drives righthand and lefthand crawlers, said vehicle being pivotally steered either rightwardly or leftwardly by a secondary power inputting unit coupled to a pivotal steering operation device, the improvement comprising the combination therewith of:

a rotary direction changing valve adapted to change a direction in which said pivotal steering operation device is rotated, a lever member linked to a valve body, a linking device coupling said lever member to said direction selector so that said valve body switches said rotary direction changing valve upon operation of said lever member to change the direction in which said pivotal steering operation device is rotated, whereby the selecting by the direction selector of power for forward movement and the selecting by the direction selector of power for backward movement is interlocked with the switching of the rotary direction changing valve.

2. A steering device of a crawler type vehicle according to claim 1, further comprising a change spool provided in said valve body, said change spool having a first position wherein a pair of outlet ports in said valve body communicate with a pair of main outlet ports in said valve body in a forward direction and a second position wherein the pair of outlet ports communicate with the power of main outlet ports in a reverse direction, said change spool being adapted to be switched over to one of said first position and said second position through a pressure oil in another pair of outlet ports in said valve body when said lever member is rocked forwardly/backwardly or rightwardly/leftwardly, whereby the pressure oil is outputted through the pair of main outlet ports.

3. A steering device for a crawler type vehicle having a righthand crawler and a lefthand crawler, said steering device comprising:
   a steering differential device for driving said righthand and lefthand crawlers, said steering differential device having first and second power inputs;
   a direction selector having a first position representing forward travel of said vehicle, a second position representing reverse travel of said vehicle, and a neutral position;
   a primary power inputting unit connected to said direction selector and said first power input so as to apply power to said first power input in a direction corresponding to the position of said direction selector;
   a pivotal steering operation device having an output representing a steering direction;
   a secondary power inputting unit coupled between said output of said pivotal steering operation device and said second power input for pivotally steering said vehicle either rightwardly or leftwardly by causing said steering differential device to drive one of said crawlers in a first direction at a speed higher than the speed of the other of said crawlers in the first direction;
   a direction changing valve which controls said pivotal steering operation device to change the steering direction represented by the output of said pivotal steering operation device;
   a pivotal steering selector valve for switching said direction changing valve to change the steering direction represented by said output of said pivotal steering operation device;
   a lever member mounted for a rotational movement and a forward/backward movement, said lever member being linked to said pivotal steering selector valve so that said direction changing valve is switched to change the steering direction represented by said output of said pivotal steering operation device responsive to the rotational position of said lever member; and
   a linking member coupling said lever member to said direction selector so that the position of said direction selector is determined responsive to the forward/backward position of said lever member.

4. A steering device according to claim 3, further comprising a speed change selector spool for selecting a speed of travel for said vehicle, said speed change selector spool being connected between said linking member and said primary power inputting unit so that the power applied to said first power input corresponds to the forward/backward position of said lever member.

5. A steering device according to claim 3, wherein said pivotal steering operation device has a rotational output with the direction of rotation representing the steering direction.

6. A steering device according to claim 3, wherein said steering differential device is a planetary steering differential device.

7. A steering device according to claim 3, wherein said pivotal steering selector valve comprises a valve body, a change spool provided in said valve body, said change spool having a first position wherein a first pair of outlet ports communicate with a pair of main outlet ports in a forward direction and a second position wherein said first pair of outlet ports communicate with said pair of main outlet ports in a reverse direction.

8. A steering device according to claim 7, wherein said change spool is switched from one of its first and second positions to the other of its first and second positions when said lever member is moved forwardly/backwardly or rightwardly/leftwardly.

9. A steering device according to claim 3, wherein said pivotal steering operation device has a rotational output with the direction of rotation representing the steering direction, and wherein said steering differential device is a planetary steering differential device.

10. A steering device according to claim 9, further comprising a speed change selector spool for selecting a speed of travel for said vehicle, said speed change selector spool being connected between said linking member and said primary power inputting unit so that the power applied to said first power input corresponds to the forward/backward position of said lever member.

11. A steering device according to claim 10, wherein said pivotal steering selector valve comprises a valve body, a change spool provided in said valve body, said change spool having a first position wherein a first pair of outlet ports communicate with a pair of main outlet ports in a forward direction and a second position wherein said first pair of outlet ports communicate with said pair of main outlet ports in a reverse direction.

12. A steering device according to claim 11, wherein said change spool is switched from one of its first and second positions to the other of its first and second positions when said lever member is moved forwardly/backwardly or rightwardly/leftwardly.

13. A steering device according to claim 4, wherein said pivotal steering selector valve comprises a valve body, a change spool provided in said valve body, said change spool having a first position wherein a first pair of outlet ports communicate with a pair of main outlet ports in a forward direction and a second position wherein said first pair of outlet ports communicate with said pair of main outlet ports in a reverse direction.

14. A steering device according to claim 13, wherein said change spool is switched from one of its first and second positions to the other of its first and second positions when said lever member is moved forwardly/backwardly or rightwardly/leftwardly.

15. A steering device according to claim 4, wherein said pivotal steering operation device has a rotational output with the direction of rotation representing the steering direction.

16. A steering device according to claim 4, wherein said steering differential device is a planetary steering differential device.

17. A steering device according to claim 5, wherein said pivotal steering selector valve comprises a valve body, a change spool provided in said valve body, said change spool having a first position wherein a first pair of outlet ports communicate with a pair of main outlet ports in a forward direction and a second position wherein said first pair of outlet ports communicate with said pair of main outlet ports in a reverse direction.

18. A steering device according to claim 17, wherein said change spool is switched from one of its first and second positions to the other of its first and second positions when said lever member is moved forwardly/backwardly or rightwardly/leftwardly.

19. A steering device according to claim 6, wherein said pivotal steering selector valve comprises a valve body, a change spool provided in said valve body, said change spool having a first position wherein a first pair of outlet ports communicate with a pair of main outlet ports in a forward direction and a second position wherein said first pair of outlet ports communicate with said pair of main outlet ports in a reverse direction.

20. A steering device according to claim 19, wherein said change spool is switched from one of its first and second positions to the other of its first and second positions when said lever member is moved forwardly/backwardly or rightwardly/leftwardly.

* * * * *